United States Patent
Läubli

(10) Patent No.: US 9,931,826 B2
(45) Date of Patent: Apr. 3, 2018

(54) DEVICE AND METHOD FOR MANUFACTURING TUBE BODIES

(75) Inventor: Julius Läubli, Rapperswil (CH)

(73) Assignee: Packsys Global (Switzerland) Ltd., Rüti (CH)

( * ) Notice: Subject to any disclaimer, the term of this patent is extended or adjusted under 35 U.S.C. 154(b) by 273 days.

(21) Appl. No.: 14/240,047

(22) PCT Filed: Aug. 22, 2012

(86) PCT No.: PCT/EP2012/066361
§ 371 (c)(1),
(2), (4) Date: Jul. 14, 2014

(87) PCT Pub. No.: WO2013/026888
PCT Pub. Date: Feb. 28, 2013

(65) Prior Publication Data
US 2014/0318682 A1   Oct. 30, 2014

(30) Foreign Application Priority Data
Aug. 23, 2011   (EP) .................................... 11178397

(51) Int. Cl.
*B32B 41/00*   (2006.01)
*B29C 65/78*   (2006.01)
(Continued)

(52) U.S. Cl.
CPC .............. *B32B 41/00* (2013.01); *B29C 53/54* (2013.01); *B29C 65/02* (2013.01);
(Continued)

(58) Field of Classification Search
CPC ... B29C 66/836; B29C 66/4322; B29C 66/49; B29C 65/02; B29C 65/7894;
(Continued)

(56) References Cited

U.S. PATENT DOCUMENTS 3,468,731 A * 9/1969 Obeda .................... B29C 65/08
156/198
5,304,768 A * 4/1994 Ishizaka ............... B23K 13/025
219/110

(Continued)

FOREIGN PATENT DOCUMENTS

JP   59230727   12/1984
JP   05250944   9/1993

OTHER PUBLICATIONS

International search report dated Dec. 20, 2012.

*Primary Examiner* — Michael N Orlando
*Assistant Examiner* — Joshel Rivera
(74) *Attorney, Agent, or Firm* — Bachman & LaPointe, PC

(57) ABSTRACT

A device for manufacturing circumferentially closed tubular tube bodies, comprising conveying means for conveying the substrate in a conveying direction, and also comprising tube-forming means which are designed to form a web-like substrate, which has a first and a second longitudinal edge, into a tubular form in which, in the circumferential direction, the first and the second longitudinal edge form or delimit a contact region, in particular abutting or overlapping region, which extends in the conveying direction, wherein the tube-forming means effect the shaping of the substrate into the tubular form in a shaping region and comprise welding means for welding the tubular form at a weld circumferential position, first sensor means, which are upstream of the shaping region; in the conveying direction, for detecting the position of the substrate web, setting means for setting the position of the substrate web transversely with respect to the conveying direction, and first control means which are designed to actuate the setting means, taking into consideration the measurement values from the first sensor means, such that the web-like substrate is held in a setpoint position (Continued)

transversely with respect to the conveying direction or such that the web-like substrate is adjusted in the direction of the setpoint position.

17 Claims, 5 Drawing Sheets

(51) Int. Cl.
    *B29C 65/00*     (2006.01)
    *B29C 53/54*     (2006.01)
    *B29C 65/02*     (2006.01)
    *B29C 65/04*     (2006.01)

(52) U.S. Cl.
    CPC ...... *B29C 65/7832* (2013.01); *B29C 65/7894* (2013.01); *B29C 66/1122* (2013.01); *B29C 66/4322* (2013.01); *B29C 66/49* (2013.01); *B29C 66/836* (2013.01); *B29C 65/04* (2013.01); *B29C 66/71* (2013.01); *B29C 66/72321* (2013.01); *B29C 66/72341* (2013.01); *B32B 2041/04* (2013.01); *B32B 2309/72* (2013.01)

(58) Field of Classification Search
    CPC . B29C 65/7832; B29C 66/1122; B29C 53/54; B29C 66/723; B29C 66/72321; B29C 66/7234; B29C 65/04; B29C 66/71; B32B 41/00; B32B 2309/72; B32B 2041/04
    USPC ..... 156/64, 272.2, 580.1, 272.8, 367, 580.2, 156/157, 158, 362, 363, 379.6, 378, 379
    See application file for complete search history.

(56) References Cited

U.S. PATENT DOCUMENTS

| | | |
|---|---|---|
| 6,310,417 B1 | 10/2001 | Hsu |
| 6,911,632 B2 | 6/2005 | Keller |
| 7,559,184 B2 | 7/2009 | Grzonka et al. |

\* cited by examiner

DEVICE AND METHOD FOR MANUFACTURING TUBE BODIES

BACKGROUND OF THE INVENTION

The invention relates to a device and a method for the manufacture of circumferentially closed tubular tube bodies.

Manufacturing plants for the manufacture of tubes are known from the prior art. For the manufacture of tube bodies, a web-shaped substrate is conveyed by conveying means, for example rolls and/or rollers, in a conveying direction and is formed by tube forming means, for example by rolls, rollers and/or stationary deflector plates, into a tubular form around a cylindrical mandrel. In so doing, the two marginal regions, which respectively adjoin one of the longitudinal edges of the substrate web, contact one another, in the tubular form in a contact region, for instance in the form of an overlapping region, in which the two marginal regions overlap one another, or a contact position, for instance in the form of an abutting edge, in which the two longitudinal edges of the substrate lie against one another (wherein in the following the terms "contact region" and "contact position" are to be deemed to be synonymous and interchangeable). In this contact region, the two marginal regions are welded to one another with the formation of a weld seam, for example by means of a high frequency welding device.

By several different influences, the contact region can move away from the welding position which is defined by the welding device, frequently resulting in defective tube bodies. When the contact region runs adjacent to or only partially through the welding region, this can result in a deficient tightness and/or pressure resistance of the tube bodies.

A travelling of the contact region in circumferential direction occurs for example on the exchanging of the substrate web, in the case of substrates which are rolled nonhomogeneously, or in the case of fluctuating tensile load of the substrate web. In order to counteract these disruptive position fluctuations, systems are used which attempt to keep constant the position of the substrate web transversely to the conveying direction before the shaping process into the tubular form, i.e. before the shaping region. For this, ultrasonic sensors are used for example, which detect at least one longitudinal edge of the substrate web, and positioning means e.g. in the form of a pivotable roller, which can correct a deviation of the edge position from the required position, if necessary.

This type of monitoring indeed takes into account selectively the edge position of the substrate web at the detection site, but not the alignment of the substrate web, i.e. the angle at which the substrate web runs past the edge sensor, for which reason, despite keeping a required edge position, the position of the contact region at the welding means can deviate considerably from the welding position. Also, the influences are not taken into account which occur between the position of the edge sensor and the welding position. Such influences include for example a fluctuation in the web tension and in the web course, owing to the friction between the mandrel and the substrate or respectively by slippage of the substrate or by position fluctuations of a shaping means, such as e.g. a forming belt. Therefore, despite the monitoring and correction of the web position to a required position, deviation can occur of contact region to welding position.

Currently, these disruptive influences are balanced out by the required position of the web edge being adjusted manually by an operator, so that the contact position again falls into the welding position. This is costly, is time-consuming (therefore generates waste) and requires experienced personnel who are in addition frequently involved periodically in monitoring tasks.

From JP 59 230727 A outside the field of the manufacture of tube bodies, a device is known which shapes a film strip into a cylindrical form and in this form welds two edges of the film strip which overlap one another. The device comprises sensor means which detect a deviation of the edges of the film strip, and positioning means which can move the film strip laterally to the transport direction of the film.

From JP 5 250955 A a device is known for the sheathing of a metal core with an insulation material for the manufacture of an electrically conductive cable. The device comprises an ultrasonic sensor, which establishes the position of one of the edges of the insulation material, and adjusting means, which influence the circumferential position of the edge so that this is kept as constant as possible.

From WO 03/024694 A1 it is known, in a device for the manufacture of tube bodies, to check an overlapping region after welding by an infrared line sensor for the maintaining of a predetermined temperature profile and, in the case of deviations, a signal is emitted for the rotation of a shaping funnel with a guide wedge arranged in the shaping region.

From WO 2006/013171 A1 a device is known for the manufacture of tubular bags, in which a film web is shaped by a shaping shoulder and two edges of the film web are connected with one another. In this device, the circumferential position of the overlapping edges is constant, wherein the radial extent of the respective edges can be adjusted by adjusting the position of the film web before the shaping means.

SUMMARY OF THE INVENTION

Proceeding from the presented prior art, the invention is based on the problem of improving a device and a method for the manufacture of circumferentially closed tubular tube bodies according to the introductory clauses of the independent claims so that the quality of the manufactured tubes is maximized and, at the same time, the expenditure for smooth operation is minimized.

The problem is solved by means of a device method having the features disclosed herein. Advantageous further developments of the invention are also described herein.

In such a device, first sensor means, arranged preferably in the conveying direction before the shaping region and preferably close to the positioning means (in particular at a distance in conveying direction of less than 20 cm) are provided for detecting the position of the substrate web. Hereby, a control variable is obtained, by which the sequence can be monitored. The first sensor means can detect the position of the substrate web for instance by detecting at least one of the longitudinal edges and/or by detecting a feature extending preferably continuously in the conveying direction, in particular a marking.

Preferably, the first sensor means comprise an ultrasonic sensor which detects the position at least of one longitudinal edge of the substrate. Ultrasonic sensors are suitable owing their minimal liability to failure. The longitudinal edges of the substrate are particularly distinctive regions which can be detected well. Furthermore, it is conceivable to use more than one ultrasonic sensor and to detect both longitudinal edges, whereby potentially a greater accuracy is achieved or respectively secondary parameters, such as for example a substrate web width, can be deduced.

The positioning means are preferably arranged in the conveying direction before the shaping region and preferably close to the positioning means (in particular at a distance in conveying direction of less than 20 cm).

The device having the features disclosed herein makes it possible, compared with the prior art, to manufacture tube bodies with particularly high quality at high efficiency and to make manual interventions by operating personnel no longer necessary. This is achieved by second sensor means, for example an ultrasonic edge sensor and/or optical image capture means being additionally provided in the shaping region, preferably at the height of the tube forming means (i.e. in the conveying direction section over which the direct interaction- or respectively contact region of the tube forming means with the substrate extends) or in a region (conveying direction section) upstream thereto in conveying direction, and/or in conveying direction after the shaping region, which second sensor means serve for the detection of a feature of the substrate. Shaping region is understood here to mean the region (conveying direction section) in which the substrate is shaped from the web form into the tubular form by the tube forming means, wherein this region as a rule extends over the direct interaction region of the tube forming means with the substrate, and namely in conveying direction before and/or behind the tube forming means or respectively their direct interaction region with the substrate. Thus, the shaping region comprises, for example in the case of tube forming means comprising a forming belt also the region of the substrate, in which the substrate is directed through the forming belt already in tubular form, but has not yet come in contact with the forming belt. In the prior art, the sensor means are evidently arranged before the shaping region, because the substrate position is allegedly easier to detect here by the simple web form and because an arrangement as close as possible to the positioning means appears to be imperative for a rapid regulation. However, in the arrangement according to the invention of additional second sensor means in the and/or in conveying direction after the shaping region, it has been surprisingly found to be advantageous that the influences of the tube forming means on the substrate position can also be taken into account in the regulating of the positioning means.

By means of the detected feature, a conclusion can be drawn as to the circumferential position of the contact region at the welding means and/or a value proportional thereto. Preferably, the feature of the substrate is the circumferential position of the contact region itself, the position of one of the longitudinal edges of the substrate and/or a marking on the substrate. For a particularly precise alignment of the contact region at the welding means, the marking preferably extends continuously in conveying direction, so that deviations can be detected and corrected accordingly at any time.

In particular, the circumferential position of the contact region is suitable as a feature to be detected, however in known basic conditions (in particular a known substrate web width) it can also be conceivable to detect the circumferential position of an edge of the substrate at a defined location in conveying direction, because for instance the circumferential position of the contact region at the welding means can be determined indirectly by the distance (in conveying direction) from the welding means and the geometry of the mandrel. In an analogous manner, it is conceivable to detect a marking on the substrate, which has a defined distance from the longitudinal edges of the substrate. The tube forming means (shaping means) are preferably arranged at least partially (for instance as shaping rolls and/or as a shaping belt) upstream of the mandrel in conveying direction.

First control means are provided, which keep the substrate web in a given position before the tube forming means transversely to the conveying direction, by actuating the positioning means as a function of the measured values of the first sensor means, so that they balance out deviations from the required position, if necessary. It is thus made possible to avoid from the outset fluctuations at the contact position owing to fluctuations in the substrate web position before the tube forming means.

Furthermore, second control means are provided, which actuate the positioning means as a function of the sensor signal of the second sensor means so that the contact region is directed in circumferential direction in the direction of the welding position or is held in the welding position. The second control means can actuate the positioning means indirectly, i.e. for instance via the first control means, wherein an output signal of the second control means enters as input signal into the first control means, for example realized in the form of a cascade control with two partial control sections (the controllers of which can be formed by the second and third control means). Alternatively, it is conceivable that the control means actuate the positioning means directly, i.e. without further control means, in particular without a further (inner) control circuit.

The second control means and the first control means act together on the positioning means, taking into consideration the measured values both of the second sensor means and also of the first sensor means, wherein preferably the first control means can also be part of the second control means or respectively can be integrated therein, i.e. can be constructed by shared control means, for instance in the form of a microcontroller, which by means of an in particular algorithmic linking of the measured values of the second and first sensor means (for instance a weighted averaging) emits a suitable control signal to the positioning means, in order to adjust the contact region in circumferential direction towards the welding circumferential position or respectively to keep it in the latter.]

By the invention, it is made possible to keep the contact region permanently in the welding position in an automated manner—without manual interventions of operating personnel—, or respectively to react more quickly to any deviations. This reduces the waste by "mis-welding" outside the contact region. Generally the invention improves the quality of the weld seam and therefore the quality of the tubes, in particular their resilience.

The contact region can be embodied here for example as an overlapping region of the two longitudinal edge regions. It is also conceivable that the contact region is embodied as an abutting edge of the two longitudinal edges of the substrate, in which the two longitudinal edges come to lie adjacent to one another at the same radial height (around the mandrel) and are welded to one another by the welding means, which is known by the technical term "butt welding".

All combinations of at least two of features disclosed in the claims, the description and/or the figures fall within the scope of the invention. To avoid repetitions, features disclosed with regard to method are to be deemed as disclosed and claimed with regard to device, and features disclosed with regard to device are to be deemed as disclosed and claimed with regard to method.

It has been found to be particularly advantageous if the second sensor means are situated close in conveying direction, in particular at a distance from the welding position of less than 1 m, preferably at a distance of approximately 20 cm to approximately 80 cm. Hereby, deviations of the contact position (or respectively of the contact region) can be balanced out owing to the remaining run of the substrate web between the positioning means and the welding means. Particularly preferably, the second sensor means are arranged close to the welding position, for example in conveying direction at the height of the mandrel, and preferably at a radial distance from the mandrel, i.e. laterally to, in particular above, the mandrel.

Preferably, the positioning means are embodied so that they adjust the preferably still flat, i.e. web-shaped, substrate transversely to the conveying direction and/or in circumferential direction. Hereby, the intake position into the forming means can be influenced and therefore also the circumferential position of the contact region.

It falls within the scope of the invention that the positioning means comprise at least one roller which can be pivoted in an angle range about a swivel axis which is arranged perpendicularly to the conveying direction (transport direction or respectively surface extent) and/or angled to the conveying direction of the substrate. For the pivoting, preferably an electric, pneumatic or hydraulic actuating drive is used. The roller can move (rotate) purely passively through the movement of the substrate, or else can be driven rotationally in an active manner by a drive.

Furthermore, it is conceivable that the first control means actuate further positioning means, which are mounted upstream or downstream of the positioning means. Hereby, at the same time, the advantages of the controlling of the web edge position, known from the prior art, by sensor means close to the positioning means and the advantages of the controlling of the substrate position according to the invention with sensor means and and/or after the shaping region (which also take into consideration the influences of the tube forming means onto the substrate) can be achieved.

Also, in a particularly advantageous manner, the second and/or the first control means can be constructed as controllers of a control circuit, for example as a PID controller or as an adaptive controller, wherein particularly preferably the second control means are constructed as controller of an outer control circuit, the correcting variable (output signal) of which is fed as reference variable (input signal or respectively target value) to the first control means, which are constructed as controller of an inner control circuit. Through the cascade control which is thus produced, the requirements with regard to the web position in transverse direction can be advantageously influenced via the positioning means both by the values detected by the second sensor means and also by the values detected by the first sensor means, wherein hereby the required position of the substrate web is influenced effectively by the second control means with the aid of the measured values detected by the second sensor means, and the maintaining of this required position is ensured by the first control means with the aid of the measured values detected by the first sensor means.

Here, a bypass can be provided, so that the outer control circuit is (effectively) the sole control circuit, and the second control means directly actuate the positioning means, whereby for instance in particular cases a faster reaction can be achieved to a running apart of welding circumferential position and contact region. Furthermore, a defect of the inner control circuit can therefore also be balanced out promptly.

It has furthermore been found to be advantageous to construct and arrange the first sensor means so that they can detect the width of the substrate web, for instance by detection of both of the longitudinal edges of the substrate web. It is hereby facilitated to use various widths of substrate webs. In particular if an edge position of the substrate web is detected as a feature, the width of the substrate web is essential information in order to determine (arithmetically) the position of the contact region. With the width information, it is sufficient to detect the position of one of the edges of the substrate web, because the position of the other edge is defined by means of the geometric general conditions (together with the width information), so that the second sensor means also only have to comprise one edge sensor.

Preferably, an elongated, preferably cylindrical, mandrel is arranged downstream of the tube forming means in conveying direction of the substrate web, wherein the tube forming means preferably lay the substrate around the mandrel. The latter is particularly well suited, owing to its geometric shapes and its robustness, for use for the mechanical shaping of tube bodies.

Preferably, after the welding and preferably after a cooling process, the tubular form can be divided by cutting means into individual tube bodies. It has been found to be particularly effective and efficient for the production to provide means which can segregate from the production process and/or mark individual tube bodies and/or sections of the tubular form. For example, the tube bodies which (probably) do not meet the quality requirements can be blown from their path by blowing means or can be ejected mechanically by power means. Alternatively or additionally, individual tube bodies can be marked for example by colour, according to their quality.

In order to ensure a high quality of the produced tube bodies, provision is made advantageously in a further development of the invention to monitor whether the circumferential position of the contact region lies in predetermined range of values (angle range) and to segregate or mark such tube bodies or sections of the tubular form which fall within a range in which the contact region lies outside this threshold and subsequently the welding position does not coincide completely with the contact region. In this case, the weld seam is not optimal, whereby the quality characteristics of the tube bodies can not be guaranteed, in particular with regard to compressive strength and durability. The control means therefore actuate the means for segregating and/or marking as a function of the circumferential position of the contact region detected by the second sensor means.

A method for the manufacture of circumferentially closed, tubular tube bodies likewise falls within the scope of the invention, wherein a substrate web is conveyed in a conveying direction and is formed into tubular form by tube forming means in a shaping region. The substrate is welded by welding means in a contact region between a first longitudinal edge and a second longitudinal edge, preferably parallel thereto. The position of the substrate web transversely to the conveying direction is influenced for example by positioning means. In the shaping region and preferably in conveying direction less than 1 m, preferably between 0.2 m and 0.8 m before the welding means, the circumferential position of the contact region, preferably over the mandrel, is detected by second sensor means and second control means actuate the positioning means as a function of the sensor signal of the second sensor means so that the contact region detected by the second sensor means is adjusted (directed) in circumferential direction in the direction of the welding circumferential position or is held in the latter.

Here, the web-shaped substrate is held in a required position by the positioning means transversely to the conveying direction, wherein in particular the required position is adapted as a function of the measured values of the second sensor means. For maintaining the required position, in particular measured values of first sensor means are taken into consideration, wherein ultrasonic sensors, which detect an edge of the substrate web, have been found to be particularly advantageous.

Furthermore, it has been found to be advantageous to draw conclusions as to be quality of the individual tube bodies from the measured values detected by the positioning means. These can be treated separately according to their respective quality, for example they can be sorted, marked and/or segregated.

For the sorting and/or marking of individual tube bodies or tubular form sections, according to a further development these are separated from the remaining tube bodies by segregating means as a function of the measured values at the time at which they were situated at the welding means. In order to be able to allocate the measured values to individual tube bodies or respectively sections of the tubular form, it is possible for example to allocate practical time stamps both to tube bodies or respectively sections of the tubular form and also to measured values. If measured values are assessed to be unsatisfactory in a time period, then tube bodies or respectively sections of the tubular form with time stamps which fall within a particular time period are segregated, in particular are blown out. Preferably, the segregating takes place with a chronological delay for the detection of faults, so that also those tube bodies can be segregated which were welded before the detected fault, whereby a filtering is made possible. The segregating means can be constructed for example by pressure nozzles which blow the tube bodies or respectively tubular form sections from a standard course, for example into collecting vessels.

Preferably, a time stamp is allocated to the individual tube bodies or respectively sections of the tubular shape, in particular on running through the second sensor means, individually and/or at a particular frequency. If the welding conditions are detected as being unsatisfactory in a particular period of time (because the contact region is detected outside a permissible range), then the elements (tube bodies or respectively sections of the tubular form) can be segregated by the segregating means with the aid of the time stamps. Thus, for example, a nozzle is activated at the moments at which elements run past it with a time stamp which is to be segregated, and the elements are therefore blown out in a targeted manner.

Preferably, the substrate is a multi-layered laminate, wherein further preferably at least one barrier layer is provided, which has a high passage barrier effect with respect to gases and/or fluids. As a barrier layer, for example, at least one metal foil or a metallization can come into use, and/or at least one barrier plastic layer, such as for example EVOH, PA, PETG.

BRIEF DESCRIPTION OF THE DRAWINGS

Further advantages, features and details of the invention will emerge from the following description of preferred example embodiments and with the aid of the drawings.

These show in.

In the figures, identical elements and elements having an identical function are marked by identical reference numbers.

DETAILED DESCRIPTION

Figure 1:
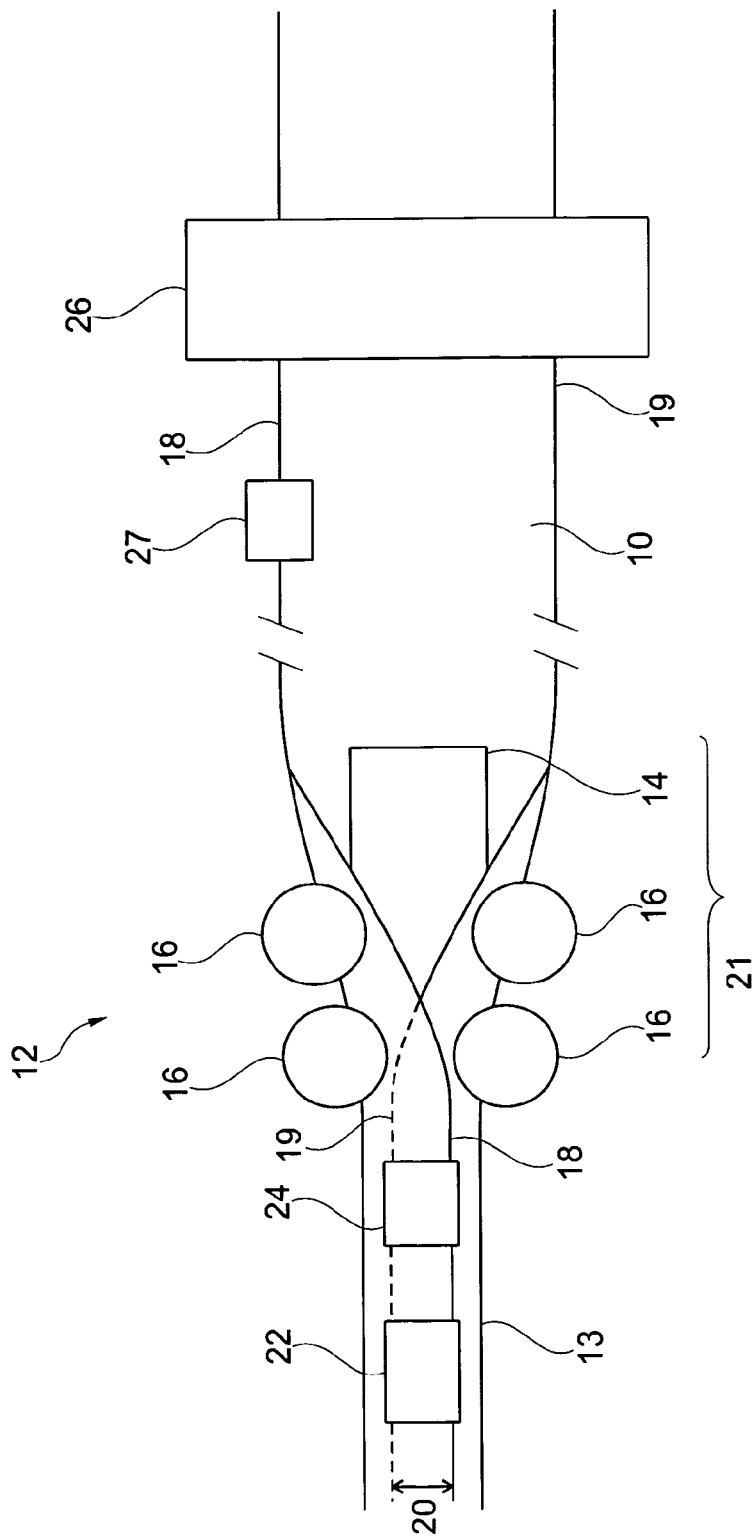
FIG. 1 a device for the manufacture of tube bodies in a top view.
Figure 2:
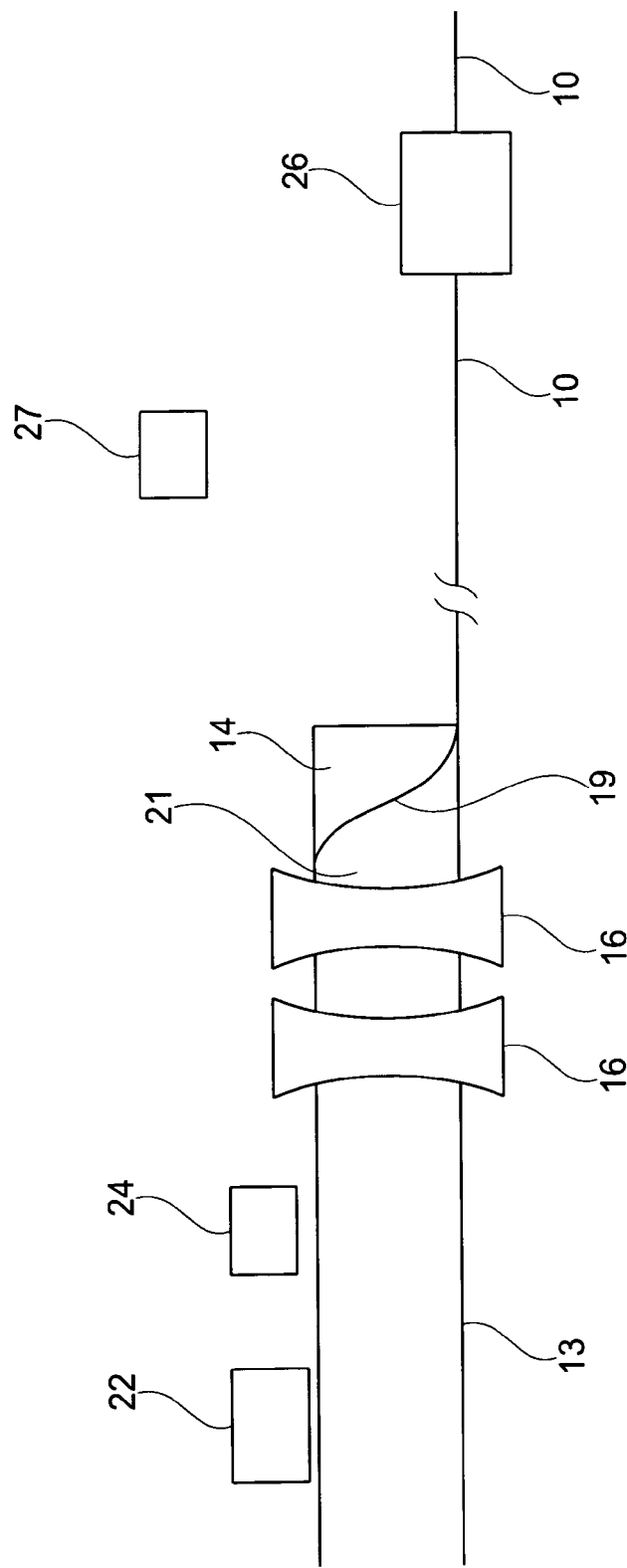
FIG. 2 a device for the manufacture of tube bodies according to FIG. 1 in a longitudinal view, FIG. 3 positioning means in a top view, FIG. 4 positioning means according to FIG. 3 in a longitudinal view, FIG. 5 example control actuation for a device according to the invention, and in FIG. 6 further development of the control actuation of FIG. 5.

FIG. 1 shows in a top view a device according to a preferred embodiment of the invention. FIG. 2 shows the same device in a longitudinal view.

A substrate web 10 is illustrated, with its two longitudinal edges 18 and 19, which are at least partially parallel. The substrate web 10 is formed by tube forming means 12 into a tubular form 13 around a cylindrical mandrel 14. The tube forming means 12 comprise concave guide rolls 16.

During the forming process, a contact region 20 forms between the longitudinal edges 18 and 19. Welding means 22, for example in the form of a high frequency welding device, and second sensor means 24 are arranged over the contact region 20.

The second sensor means 24 are arranged here directly over the contact region, which is configured as an overlapping region, however it is alternatively also conceivable to arrange the second sensor means 24 shortly before the contact region, for instance as in the position 24*b* illustrated in dashed lines. Thus, the second sensor means 24 can detect one of the longitudinal edges of the substrate and determine the position of this edge at the welding means with the aid of the width of the substrate and the geometry of the forming means. To determine the position of the second longitudinal edge of the substrate in the welding region, a constant displacement can be assumed, wherein here preferably the width of the substrate web 10 is measured before reaching the tube forming means 12 for calculating this displacement. Alternatively, the edge position can also be detected (in an analogous manner to the first longitudinal edge).

Before the forming, the substrate web 10 is moved by positioning means 26 transversely to the conveying direction (web running direction or respectively longitudinal direction of the substrate), i.e. is displaced in a parallel manner in the plane of the surface extent. First sensor means 27, here in the form of an ultrasonic edge sensor, are arranged over the second edge 18. Advantageously, the first sensor means 27 extend over the entire substrate web (as illustrated in dashed lines as 27*b*), so that the width of the substrate web can be detected and this is available as parameter for calculations (for instance the arithmetic determining, described above, of the circumferential position of the first longitudinal edge in the welding region with a known position of the second longitudinal edge).

Control means, which are connected with one another and with the positioning means 26 in a signal-conducting manner, are not shown. These control means can be configured as homogeneous control means or by logically separate first and second control means (for instance several microcontrollers).

Figure 3:
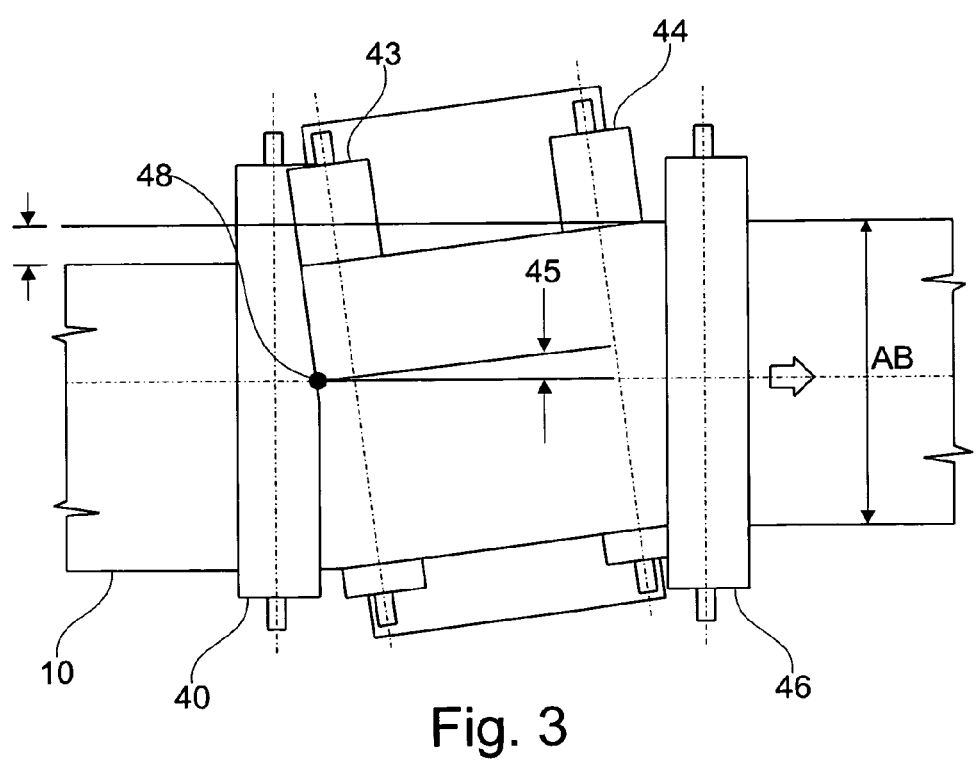

The substrate web is transported from right to left in the plane of the drawing and is moved (displaced) by means of the positioning means 26 transversely to the conveying direction. An embodiment of the positioning means 26 (as at least one positioning roller rotatably mounted in a rotating frame) is illustrated in FIG. 3 and will be described later.

The extent to which the web is moved by means of the positioning means in transverse direction (i.e. perpendicularly to the conveying direction) is determined by the control means. They are configured so that they actuate the positioning means—more precisely, an actuating drive of the positioning roller—such that these adjust the substrate so that the longitudinal edge 18 is held in a required position. In order to detect deviations from the required position and to counteract these accordingly, the measurement results of the first sensor means 27 are taken into consideration by the control means during the actuation of the positioning means 26. A corresponding control is illustrated and described by way of example below in FIG. 5.

Further downstream with respect to the web (i.e. in conveying direction), the web-shaped substrate 10 is brought into a tubular form by the tube forming means 12. For this, the substrate is bent by the guide rolls 16 and laid around the cylindrical mandrel 14, wherein the two marginal regions at the longitudinal edges 18 and 19 of the substrate contact one another, in particular overlap or respectively abut one another, and enclose in circumferential direction between one another the contact region 20, here in the form of an overlapping region. The substrate is welded to itself in a welding region by the welding means 22, such that a weld seam is formed, extending along the conveying direction of the tubular form, which weld seam under ideal circumstances coincides with the contact region. The welding means 22 are formed for example by welding strips, which are acted upon at high frequency.

In order to ensure that the contact region 20 coincides with the welding region, the second sensor means 24 are arranged as close as possible to the welding means 22. They detect the position of the contact region 20 in circumferential direction. Through the small distance from the welding means 22, the position of the contact region 20 corresponds in circumferential direction at the sensor means 24 as precisely as possible to the position of the contact region 20 in circumferential direction at the welding means 22.

The detected position of the contact region 20 is imparted to the control means as a sensor signal via corresponding signal lines. If the position of the contact region 20 is too far distant from the centre of the welding region (therefore comes too close to its edge) or if it is even outside the welding region, the position of the substrate web 10 must be adapted so that the contact region 20 is directed nearer again to the centre of the welding region. For this, the control means actuate the positioning means accordingly, whereby the substrate web is moved in a parallel manner, so that the contact region travels in circumferential direction towards the welding region. If the contact region is, for example, to be displaced (viewed in conveying- or respectively web direction) circumferentially in a clockwise direction, then the substrate web must be adjusted towards the left in conveying direction. Furthermore, it is conceivable to detect through the course of the position of the contact region 20 a "running away", and to counteract this promptly. A corresponding control is described for instance in FIG. 5.

Figure 4:
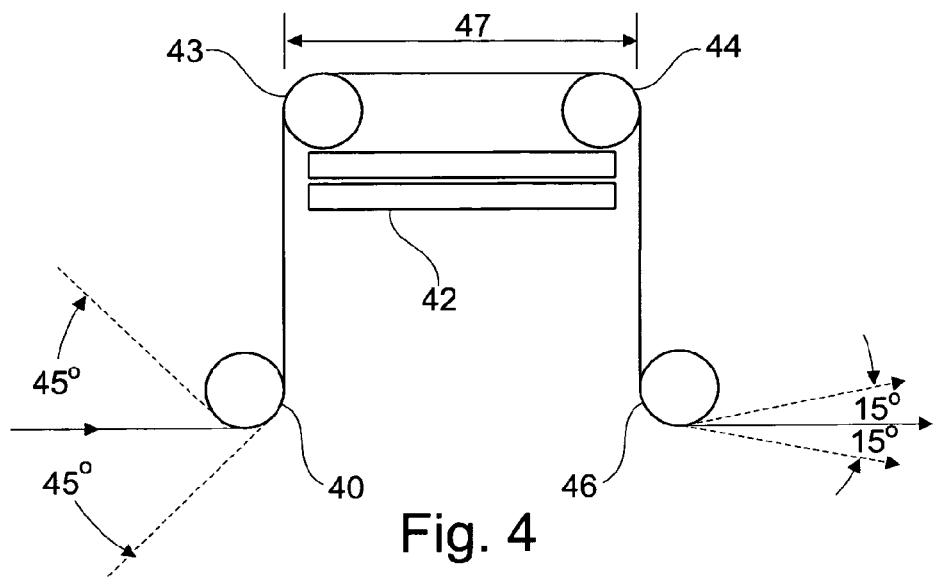

FIG. 3 shows the positioning means 26 in a preferred embodiment in a top view. FIG. 4 shows the same positioning means 26 in a side view.

The positioning means 26 comprise an infeed roller 40, a rotating frame 42, two rotating frame rollers 43 and 44, and a fixing roller 46. The rollers are arranged in two pairs, which are situated respectively at one height. A first pair form the infeed roller 40 and the fixing roller 46, a second pair form the two rotating frame rollers 43 and 44, which are mounted on the rotating frame 42. The rotating frame 42 is able to be swiveled about a swivel angle 45 about a swivel axis 48 standing perpendicularly to the conveying direction (on the rotating frame 42), by means of an, in particular electromotive, actuating drive which, for reasons of clarity, is not illustrated. The rotating frame 42 has a rotating frame length 47.

The substrate web 10 runs via the infeed roller 40 into the positioning means 26. It is now directed via the rotating frame 42 with its rotating frame rollers 43 and 44 and finally leaves the positioning means 26 via the fixing roller 46.

Depending on the angle 45, the substrate web 10 is moved transversely to its conveying direction. The correlation for the displacement here is:

$$\text{displacement} = \text{rotating frame length} * \sin(\text{swivel angle})$$

If therefore, for example, a greater displacement is required, the rotation angle 45 must be increased.

The present invention is not restricted to the example embodiment which is shown. In addition to the position which is shown in conveying direction in front of the welding means 22, the second sensor means 24 can also be arranged behind welding means 22 in conveying direction.

As a whole, the invention succeeds in a particularly advantageous manner in maximizing the quality of the manufactured tubes and, at the same time, in minimizing the effort for smooth operation.

Figure 5:
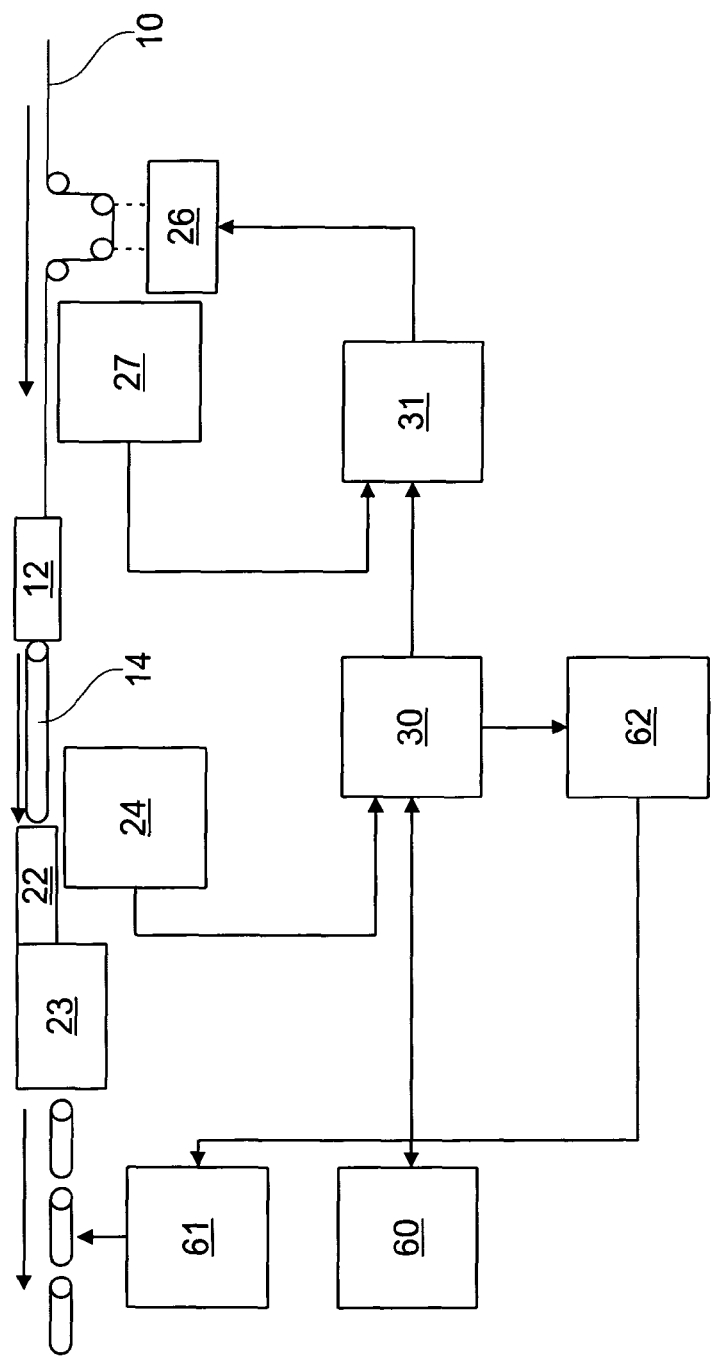

FIG. 5 shows an example circuit arrangement for controlling the positioning means 26, in which the control means are formed by second and first control means 30 or respectively 31.

Thus, for example, a control circuit (hereinafter designated "inner control circuit") is provided, in which the first control means 31 are formed by a PID controller and in which the required position is to be regarded as reference variable, the edge position detected by the first sensor means 27 as control variable. The first control means 31 emit to the positioning means 26 a correcting variable dependent on the control deviation (i.e. the difference between the required position and the edge position), so that as a whole the edge position is guided into the required position.

In order to direct the contact region in circumferential direction (again) into the welding region, for example an outer control circuit can be provided, in which the circumferential position of the contact region 20, detected by the second sensor means 24, is fed as control variable, and a signal corresponding to the circumferential position of the welding region of the welding means is fed as reference variable to the second control means 30, (likewise) constructed as a PID controller, which counteracts a deviation of the control variable from the reference variable, by emitting a corresponding correcting variable to the inner control circuit (the first control means 31), which enters therein in turn as reference variable. It is also conceivable here to determine the reference variable of the outer control circuit in a variable manner by a user interaction unit 60, which can also serve additionally to indicate any status information.

The inner and/or outer control circuit can also be realized in terms of software in a microcontroller, which accordingly processes the input signals of the two sensor means 24 and 27 digitally and emits a suitable output signal to the positioning means 26. Thus, the position values detected by the two sensor means 24 and 27 can serve as input values of a function and/or of an algorithm, which determine from these input values an optimum position value of the longitudinal edge 18 of the substrate web 10 (by physically given general conditions and/or by stored, previously determined data sets), and emit this to the positioning means 26 as a corresponding electrical signal.

Discharge means 61 are also provided, which in the case of too great a control deviation at the second control means 30 after a chronological delay (illustrated here by a delay unit 62) actuate discharge and/or marking means 61, in order to segregate and/or mark possibly defective tube bodies. Through the chronological delay, the run-through time of the substrate or respectively of the tube bodies from the second sensor means up to the discharge means 61 is balanced out.

Figure 6:
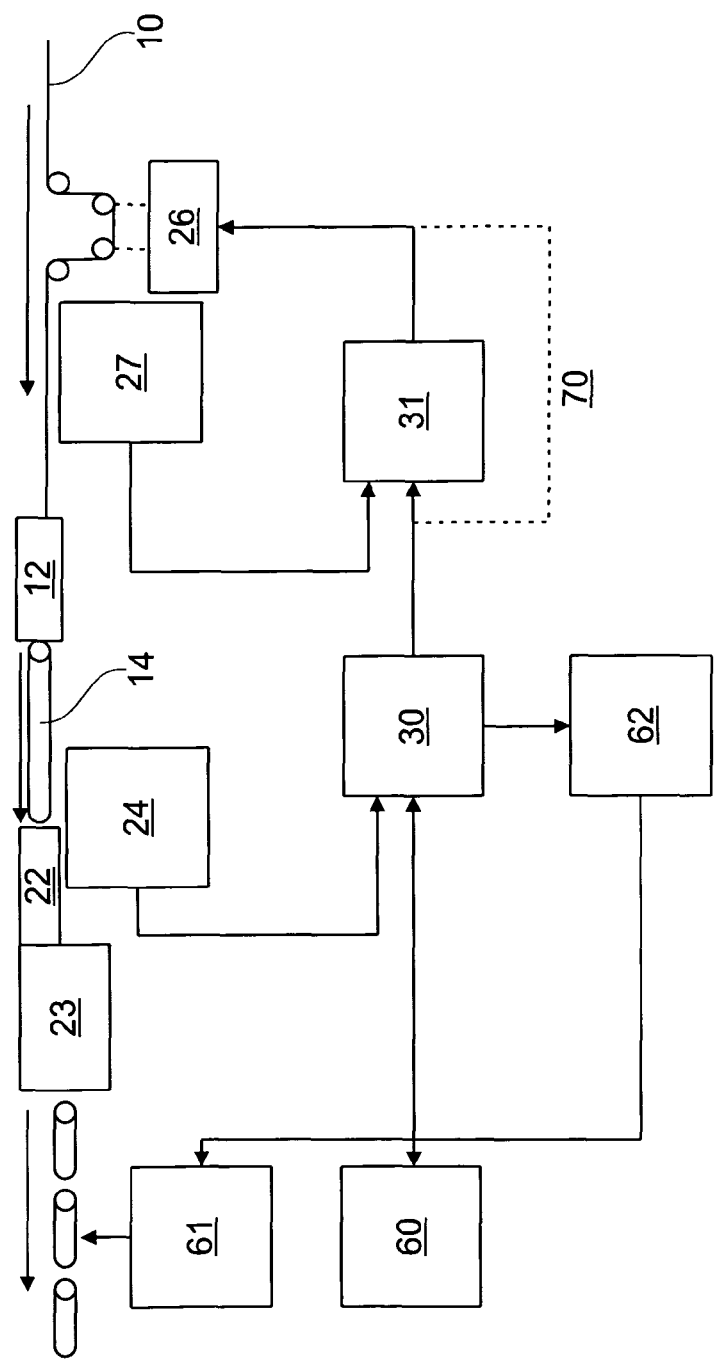

FIG. 6 expands the control arrangement of FIG. 5 in that the outer control circuit can control the positioning means 26 directly through a bypass 70, i.e. the correcting variable enters directly into the positioning means 26.

An embodiment (not shown) is also conceivable, in which no first control means 31 are provided, but rather the second control means 30 always directly actuate the positioning means 26.

The invention claimed is:

1. A device for the manufacture of circumferentially closed tube bodies, comprising
    conveying means for conveying a substrate (10) in a conveying direction,
    tube forming means (12), which are constructed for forming the substrate (10) having a first and a second longitudinal edge (18, 19), from a web shape into a tubular form (13), in which in circumferential direction through the first and the second longitudinal edge (18, 19) a contact region (20), in particular an abutting or overlapping region, extending in the conveying direction, is formed or delimited, wherein the tube forming means bring about the shaping of the substrate (10) into the tubular form (13) in a shaping region (21),
    welding means (22) for welding the tubular form (13) at a welding circumferential position,
    first sensor means (27), in conveying direction before the shaping region (21), for detecting transverse position of the substrate (10) relative to the conveying direction while the substrate (10) is in the web shape, which comprise at least one sensor, which is constructed and aligned detecting the position at least of one longitudinal edge (18, 19) and/or of a marking of the web-shaped substrate (10) extending in conveying direction,
    positioning means (26) for adjusting the transverse position of the substrate (10) transversely to the conveying direction,
    first control means (31), for actuating the positioning means (26) taking into consideration measured values of the first sensor means (27) so that the substrate (10) is held in a required position transversely to the conveying direction or that the substrate (10) is adjusted in the direction of the required position,
characterized in that
    second sensor means (24) provided in the conveying direction at a height of the shaping region (21) or of the region arranged downstream of the tube forming means (12) in the conveying direction, in which the substrate (10) is already shaped into the tubular form (13), wherein the second sensor means (24) are constructed, designated and arranged for the detection of the circumferential position of the contact region (20), the position at least of one of the longitudinal edges (18, 19) and/or a marking on the substrate,
    and second control means (30), wherein the first and second control means (31, 30) are constructed for actuating the positioning means (26) jointly, taking into consideration the measured values both of the second sensor means (24) and the first sensor means (27), so that the contact region (20) is adjusted in circumferential direction in the direction of the welding circumferential position or the contact region (20) is held in circumferential direction in the welding circumferential position, wherein the first sensor means (27) is located, in the conveying direction, after the positioning means (26), and wherein the second control means defines an outer control circuit which generates an output signal which is fed as an input signal to the first control means, and wherein the first control means defines an inner control circuit.

2. The device according to claim 1, wherein second control means (30) are constructed actuating the positioning means indirectly via the first control means (31).

3. The device according to claim 1, wherein the second sensor means (24) are arranged in web direction at a distance of less than 1 m, before and/or after the welding means (22).

4. The device according to claim 1, wherein the positioning means (26) have at least one roller able to be pivoted by means of an actuating drive about a swivel axis (48) arranged perpendicularly to the conveying direction and/or angled to the conveying direction.

5. The device according to claim 1, wherein the second control means (30) are constructed as an outer control circuit, the correcting variable of which serves as the reference variable for the first control means (31), constructed as inner control circuit.

6. The device according to claim 1, wherein the second control means (30) can actuate the positioning means (26) directly, by bypassing the first control means (31).

7. The device according to claim 1, wherein the first sensor means (27) are constructed for detecting the width of the substrate (10) by detecting both longitudinal edges (17 and 18) of the substrate (10).

8. The device according to claim 1, wherein the second control means (30) are constructed so that, taking into consideration the width, preferably detected by the first sensor means (27), and taking into consideration the position of the feature of the substrate (10) detected by the second sensor means (24), they draw a conclusion as to the circumferential position of the contact region (10) in conveying direction at the height of the welding means (22).

9. The device according to claim 1, wherein discharge means (61) and/or marking means are provided, which are constructed segregating and/or marking individual tube bodies or sections of the tubular form (13) as a function of a control signal of the second and/or first control means (30, 31).

10. A method for the manufacture of circumferentially closed tube bodies wherein a web-shaped substrate (10) is conveyed in conveying direction and is formed into a tubular form (13) in a shaping region (21), and in the tubular form (13) forms a contact region (20), in particular an abutting or overlapping region, between a first and a second longitudinal edge (18, 19) parallel thereto, wherein the substrate is welded in conveying direction after the shaping region (21) in a welding circumferential position, and wherein the web-shaped substrate (10) is held in a required position transversely to the conveying direction taking into consideration a substrate position detected in conveying direction before the shaping region (21) and after a positioning means (26), wherein
a feature is detected, such that with the aid of the detected feature the circumferential position of the contact region (20) is determined and the position of the substrate (10) transversely to the conveying direction before the shaping region is adjusted as a function of the established circumferential position so that the contact region (20) is adjusted in circumferential direction in the direction of the welding circumferential position or is held in circumferential direction in the welding circumferential position, by the required position being adapted dynamically as a function of the circumferential position of the contact region (20) detected in conveying direction at the height of the shaping region (21) or after the shaping region (21).

11. The method according to claim 10, wherein with the aid of the detected circumferential position of the contact region (20), detected in conveying direction at the height of the shaping region (21) or after the shaping region (21), or its course, conclusions are drawn in an automated manner as regards the quality of the tube bodies or respectively the sections of the tubular form, and the tube bodies or respectively sections of the tubular form are sorted, marked and/or segregated by means of their quality, wherein a time stamp is respectively allocated preferably to individual tube bodies or respectively sections of the tubular form on running through the welding means (22), and tube bodies or respectively sections of the tubular form are sorted, marked and/or segregated through on the basis by means of the time stamp.

12. The method according to claim 10, wherein a tube head is mounted onto a first end of the tube body, the tube body is filled with a filling material, and the second end of the tube body is subsequently closed.

13. The method according to claim 10, wherein the substrate position detected before the shaping region (21) is detected by detection of the position at least of one longitudinal edge (18, 19) and/or of a feature extending preferably continuously in conveying direction.

14. The device according to claim 1, wherein the at least one sensor of the first sensor means (27) comprises an ultrasonic edge sensor.

15. The device according to claim 1, wherein the feature of the web-shaped substrate (10) extends continuously in the conveying direction.

16. The device according to claim 3, wherein the second sensor means (24) are arranged in web direction at a distance of between 0.2 m and 0.8 m before and/or after the welding means (22).

17. The method according to claim 10, wherein the feature is selected from the group consisting of the circumferential position of the contact region (20), the circumferential position of one of the longitudinal edges (18, 19) and a marking on the substrate in conveying direction at the height of the shaping region (21) or after the shaping region.

* * * * *